United States Patent
Caceres Hernandez et al.

(10) Patent No.: US 8,758,479 B2
(45) Date of Patent: Jun. 24, 2014

(54) NICKEL RECOVERY FROM A HIGH FERROUS CONTENT LATERITE ORE

(75) Inventors: Omar Yesid Caceres Hernandez, Bogotá (CO); Harald Muller, Eleebana (AU); Graham Reynolds, Kotara South (AU); Houyuan Liu, Henderson, NV (US)

(73) Assignee: BHP Billiton SSM Development Pty Ltd, Perth, Western Australia (AU)

( * ) Notice: Subject to any disclaimer, the term of this patent is extended or adjusted under 35 U.S.C. 154(b) by 1099 days.

(21) Appl. No.: 12/599,586

(22) PCT Filed: May 12, 2008

(86) PCT No.: PCT/AU2008/000646
§ 371 (c)(1),
(2), (4) Date: Jun. 17, 2011

(87) PCT Pub. No.: WO2008/138039
PCT Pub. Date: Nov. 20, 2008

(65) Prior Publication Data
US 2011/0232421 A1 Sep. 29, 2011

(30) Foreign Application Priority Data
May 14, 2007 (AU) ................................ 2007902546

(51) Int. Cl.
*C22B 23/00* (2006.01)
(52) U.S. Cl.
USPC ............... 75/722; 75/743; 423/139; 423/140; 423/150.1
(58) Field of Classification Search
USPC .................. 75/722, 743; 423/139, 140, 150.1
See application file for complete search history.

(56) References Cited

U.S. PATENT DOCUMENTS

| 3,884,681 A | 5/1975 | Gandon |
| 4,301,125 A | 11/1981 | Burkin et al. |
| 4,410,498 A | 10/1983 | Hatch et al. |

(Continued)

FOREIGN PATENT DOCUMENTS

| GB | 2086872 | 5/1982 |
| WO | WO96/20291 | 7/1996 |
| WO | WO00/53820 | 9/2000 |
| WO | WO01/29276 | 4/2001 |

(Continued)

OTHER PUBLICATIONS

Duarte et al. Derwent Acc-No. 2006-353892. Patent Family for WO 2006-043376 A1, published May 26, 2006.*

(Continued)

*Primary Examiner* — George Wyszomierski
*Assistant Examiner* — Tima M McGuthry Banks
(74) *Attorney, Agent, or Firm* — Brinks Gilson & Lione; G. Peter Nichols

(57) ABSTRACT

A process is described for the recovery of nickel and/or cobalt from laterite or partially oxidized lateritic ores having a substantial proportion of the iron present in the ferrous state. The process includes providing a laterite or partially oxidized laterite ore wherein a substantial proportion of the iron present in the ore is in the ferrous state; acid leaching the ore to provide a product leach solution containing at least ferrous iron, nickel and cobalt together with acid soluble impurities; and recovering the nickel and cobalt from the product leach solution with a selective ion exchange resin in an ion exchange process leaving the ferrous iron and other acid soluble impurities in the raffinate.

14 Claims, 2 Drawing Sheets

(56) References Cited

U.S. PATENT DOCUMENTS

| | | | |
|---|---|---|---|
| 5,571,308 A | | 11/1996 | Duyvesteyn et al. |
| 7,594,951 B2* | | 9/2009 | Rossiter .................. 75/714 |
| 7,597,738 B2* | | 10/2009 | Liu et al. ................. 75/416 |
| 7,871,584 B2* | | 1/2011 | Liu et al. ................ 423/150.4 |
| 2001/0001650 A1* | | 5/2001 | Duyvesteyn et al. ......... 423/139 |
| 2007/0041884 A1 | | 2/2007 | Zontov |
| 2007/0297960 A1* | | 12/2007 | Krebs ..................... 423/140 |
| 2008/0271571 A1* | | 11/2008 | Liu et al. ................. 75/743 |

FOREIGN PATENT DOCUMENTS

| | | |
|---|---|---|
| WO | WO2004/067787 | 8/2004 |
| WO | WO2005/005671 | 1/2005 |
| WO | WO2006/029443 | 3/2006 |
| WO | WO2006/029499 | 3/2006 |

OTHER PUBLICATIONS

Duarte et al. Derwent Acc-No. 2006-222582. Patent Family for WO 2006-029443 A1, published Mar. 23, 2006.*

* cited by examiner

NICKEL RECOVERY FROM A HIGH FERROUS CONTENT LATERITE ORE

This application claims priority to PCT Application Serial No. PCT/AU2008/000646 filed May 12, 2008 published in English on Nov. 20, 2008 as PCT WO 2008/138039 and also to Australian Application No. 2007/902546 filed May 14, 2007, the entire contents of each are incorporated herein by reference.

FIELD OF THE INVENTION

In general, the present invention relates to a new method for recovering nickel from a laterite or partially oxidised lateritic ore. In a preferred embodiment, the present invention provides a new process for treating partially oxidised ore which contains a substantial proportion of its iron component in ferrous form, and which involves heap leaching, atmospheric leaching or pressure leaching of the ore, or any combination of these leaching methods, followed by nickel and cobalt recovery and impurity removal by an ion exchange process and the production of mixed nickel and cobalt hydroxide. Cobalt may also be recovered separately following a further ion exchange, solvent extraction or other known processes by precipitation as cobalt hydroxide or cobalt sulfide.

BACKGROUND OF THE INVENTION

Laterite nickel and cobalt ore deposits generally contain oxidic type ores, limonites, and silicate type ores, saprolites, as two layers in the same deposits, separated by a transition zone.

The higher nickel content saprolites tend to be treated by a pyrometallurgical process involving roasting and electrical smelting techniques to produce ferro-nickel. This treatment normally involves a drying step, followed by a reduction roast step to partially convert the nickel oxides to nickel, and smelting in an electrical furnace. This is a highly energy intensive process and requires a high grade saprolite source to make it economic. It also has the disadvantage that financial value of any cobalt in the ore, which is recovered into the ferro-nickel, is not realised.

The high nickel and cobalt content limonite is normally commercially treated hydrometallurgically by the High Pressure Acid Leach (HPAL) process using sulphuric acid in which iron is precipitated as hematite as ferric oxide, or by a combination of pyrometallurgical and hydrometallurgical processes, such as the Caron reduction roast-ammonium carbonate leach process.

Other acid leach processes for extracting nickel and cobalt from laterites are described in the literature. These include atmospheric pressure acid leaching, separately leaching the limonite and saprolite fractions by combinations of high pressure and atmospheric leaching, and heap leaching. In these acid leach processes sulfuric acid is usually the acid of choice, but the use of hydrochloric acid, or organic acids has also been described. As the iron in the ores treated is in the ferric state, the leached iron is precipitated as jarosite, goethite, ferrihydrite, hematite or iron hydroxide, depending on the technology used. The relevant recovery methods for nickel and cobalt described are also limited to the treatment of liquor containing ferric as the unique iron component.

A common feature in atmospheric pressure acid leaching is that a substantial portion of the high iron content of the laterite leaches along with the nickel and cobalt, and reports as ferric ions in the product leach solution (PLS), and current processes for treatment of the (PLS) focus on the recovery of target metals such as nickel, cobalt and occasionally copper from the leachate containing ferric as the dominant iron component.

Heap leaching is a conventional method of economically extracting metals from ores and has been successfully used to recover materials such as copper, gold, uranium and silver. Generally it involves piling raw ore directly from ore deposits into heaps that vary in height. The leaching solution is introduced onto the top of the heap to percolate down through the heap. The effluent liquor is drained from the base of the heap and passes to a processing plant where the metal values are recovered.

Heap leaching of laterites is taught in U.S. Pat. No. 5,571,308 (BHP Minerals International, Inc), which describes a process for heap leaching of high magnesium containing laterite ore such as saprolite.

U.S. Pat. No. 6,312,500 (BHP Minerals International, Inc) also describes a process for heap leaching of laterites to recover nickel, which is particularly effective for ores that have a significant clay component such as nickel-containing smectite and nontronite (greater than 10% by weight).

A major problem with the heap leach process is that the leachate produced contains, in addition to the nickel and cobalt values targeted, large quantities of ferric iron ions and a variety of other impurities. The purification of similar nickel solutions from commercial laterite acid leach processes involves neutralisation of the acid content, precipitation of ferric iron ions, followed by production of a nickel/cobalt intermediate, a re-dissolution step, and complex solvent extraction stages to produce saleable nickel and cobalt. The purification steps generally aim for complete removal of iron and the other impurities.

Ion Exchange (IX) processes have been disclosed for the extraction of both the nickel and cobalt from the nickel leachate, leaving the major impurities in the raffinate.

US Patent 95/16118 (BHP Minerals International Inc.) describes an ion exchange process for separating nickel from the leachate from treatment of laterite by the pressure acid leach process. Nickel is extracted by the resin at pH less than 2, and stripped with sulfuric acid for subsequent electrowinning. Cobalt remains in the raffinate along with other impurities, and after solution neutralisation, is precipitated as a sulfide.

Patent WO 00/053820 (BHP Minerals International Inc.) describes the ion exchange extraction of nickel and cobalt from acid sulfate leach solution onto the resin, and the subsequent acid stripping of the metals from the resin, and their separation by solvent extraction.

U.S. Pat. No. 6,350,420 B1 (BHP Minerals International Inc.) also teaches the use of ion exchange resin in a resin in pulp process to extract nickel and cobalt onto the resin from an acid leach slurry.

The preferred resin used in these patents is Dow M4195 which has the functional group bis-picolylamine and the adsorption constants indicating selectivity of the resin at pH 2 are in the order of $Cu^{2+}>Ni^{2+}>Fe^{3+}>Co^{2+}>Fe^{2+}>Mn^{2+}>Mg^{2+}>Al^{3+}$. The above patents all aim to produce relatively pure nickel solution, or nickel and cobalt strip solutions from the ion exchange resins.

An improvement to the ferro nickel process described earlier is taught in International Patent application (PCT/AU.2005/001360) (BHPBilliton SSM Development Pty Ltd) which teaches a method of producing a nickel/iron hydroxides to feed the smelting step. This involves heap leaching of the laterite, an ion exchange stage with Dow M4195 to separate nickel and some of the iron from the ferric ion containing product liquor. As ferric ion concentration in the PLS produced is ten times the concentration of the nickel ions, the effective resin capacity for nickel adsorption is decreased due to the loading of the ferric ions.

It has been surprisingly found following detailed experimental work and pilot plant operation, that contrary to what is taught in prior art, some partially oxidised laterite ores which are less weathered, or have a younger geological history, contain a substantial proportion of their iron content in ferrous form, and when acid leached in a heap leach process to recover nickel, generate a product leach solution in which most of the iron is in ferrous form. This discovery has required a changed philosophy for iron treatment in hydrometallurgical processes in the laterite industry, and has led to the process of the present invention which overcomes or at least alleviates one or more of the difficulties associated with the prior art.

The above discussion of documents, articles and the like is included in the specification solely for the purpose of providing a context for the present invention. It is not suggested or represented that any or all of these matters formed part of the prior art base or were common general knowledge in the field relevant to the present invention before the priority date.

SUMMARY OF THE INVENTION

In general, the present invention relates to a new method for recovering nickel from partially oxidised laterite ore which contains a substantial proportion of its iron content in the ferrous state. In a preferred embodiment, the present invention provides a new process for treating laterite ore which contains a substantial proportion of its iron component in ferrous state, and which involves heap leaching, atmospheric pressure leaching, high pressure leaching, or any combination of these leaching processes of the ore, followed by nickel and cobalt recovery, impurity removal by an ion exchange process, solvent extraction or other known methods and mixed nickel and cobalt hydroxide production by neutralisation.

Accordingly, the present invention resides in a process for the recovery of nickel and/or cobalt from laterite or partially oxidised laterite ores having a high ferrous iron content, said process including the steps of:
  a) providing a laterite or partially oxidised laterite ore wherein a substantial proportion of the iron present in the ore is in its ferrous state;
  b) acid leaching the ore to provide a product leach solution containing at least ferrous iron, nickel and/or cobalt together with acid soluble impurities; and
  c) recovering the nickel and/or cobalt from the product leach solution with a selective ion exchange resin in an ion exchange process leaving the ferrous iron and other acid soluble impurities in the raffinate.

The term "substantial proportion" as used in relation to describing the content of ferrous iron in the laterite ore, is indicative that the laterite ore contains a relatively higher proportion of ferrous to ferric iron than found in many laterite ore deposits. Typically, what is meant by a "substantial proportion" is that the content of ferrous iron represents about 30% or greater of the total iron content in the laterite ore.

The process of the present invention is particularly suitable for the recovery of cobalt together with the nickel. The selective ion exchange resin in one embodiment, is selective for the adsorption of nickel, but preferably is selective for the adsorption of both nickel and cobalt in a nickel and cobalt recovery process.

In general, the present invention provides a process for producing a nickel hydroxide or mixed nickel/cobalt hydroxide intermediate from laterite ore. It is applicable to laterite ore bodies, such as partially oxidised laterites, where a substantial proportion of the iron is in ferrous form, and reports to the leachate as ferrous ions. The invention is particularly applicable to a process where the laterite ore has been subjected to a heap leach process, wherein the nickel and cobalt is leached with sulfuric acid to form a product leach solution (PLS) containing nickel, cobalt, iron in ferrous and ferric form and acid soluble impurities, the process preferably includes the steps of:
  1. Partially neutralising the PLS to precipitate and separate any ferric iron from solution. The PLS is then in a ferrous sulfate media form.
  2. Contacting the product leach solution containing the nickel, cobalt, ferrous iron and acid soluble impurities with preliminary ion exchange (IX) resin, wherein the resin selectively adsorbs any copper from the solution leaving the nickel, cobalt, ferrous iron and the acid soluble impurities in the raffinate;
  3. Contacting the raffinate with a selective ion exchange resin wherein the resin selectively adsorbs nickel and cobalt, leaving the ferrous iron and other impurities in the raffinate.
  4. Stripping the nickel and cobalt from the selective ion exchange resin with a sulfuric acid solution to produce an eluate containing nickel and cobalt; and
  5. Neutralising the eluate to precipitate a mixed nickel cobalt hydroxide product; or separating the cobalt before precipitation by known processes such as sulfidation, solvent extraction, or ion exchange.

In general, the process forms part of an overall process for the recovery of nickel and/or cobalt. Preferably, the product leach solution is produced by a heap leach process wherein at least one heap of ore is established and leached with a sulfuric acid supplemented liquor stream, which will percolate through the heap to produce a product leach solution containing at least nickel, cobalt, ferrous and ferric iron and acid soluble impurities. More preferably, the heap leach process is established in a counter current system whereby:
  a) a primary and a secondary heap are established;
  b) the secondary heap is treated with a liquor stream comprising recycled raffinate from the ion exchange process supplemented by sulfuric acid and the recycled acidic PLS from the primary heap, to produce an intermediate PLS; and
  c) treating the primary heap with the intermediate PLS to produce the PLS containing at least nickel, cobalt, iron and acid soluble impurities.

Whereas it is envisaged that the product leach solution will be produced by a heap leach process, preferably a counter current heap leach process, the process may also be applied to a product leach solution containing at least nickel, cobalt and ferrous iron produced from partially oxidised lateritic ore by leaching with sulfuric acid by other means, such as leachate from a pressure acid leach process, an atmospheric leach process, or any combination of pressure, atmospheric and heap leaching.

DETAILED DESCRIPTION OF THE INVENTION

In a preferred embodiment, where the product leach solution results from an acid heap leach process, high ferrous iron content laterite ore is crushed to a size, preferably less than 25 mm size, and agglomerated if required for heap porosity using water, sulfuric acid, or other binding materials, to improve heap permeability The agglomerated ore may be arranged into a single heap but preferably at least two heaps, a primary and a secondary heap, to be operated as a counter current heap leach system. The counter current heap leach process has the advantage of lower acid consumption, lower ferric ion concentration and a cleaner product leach solution than the single heap system.

Figure 1:
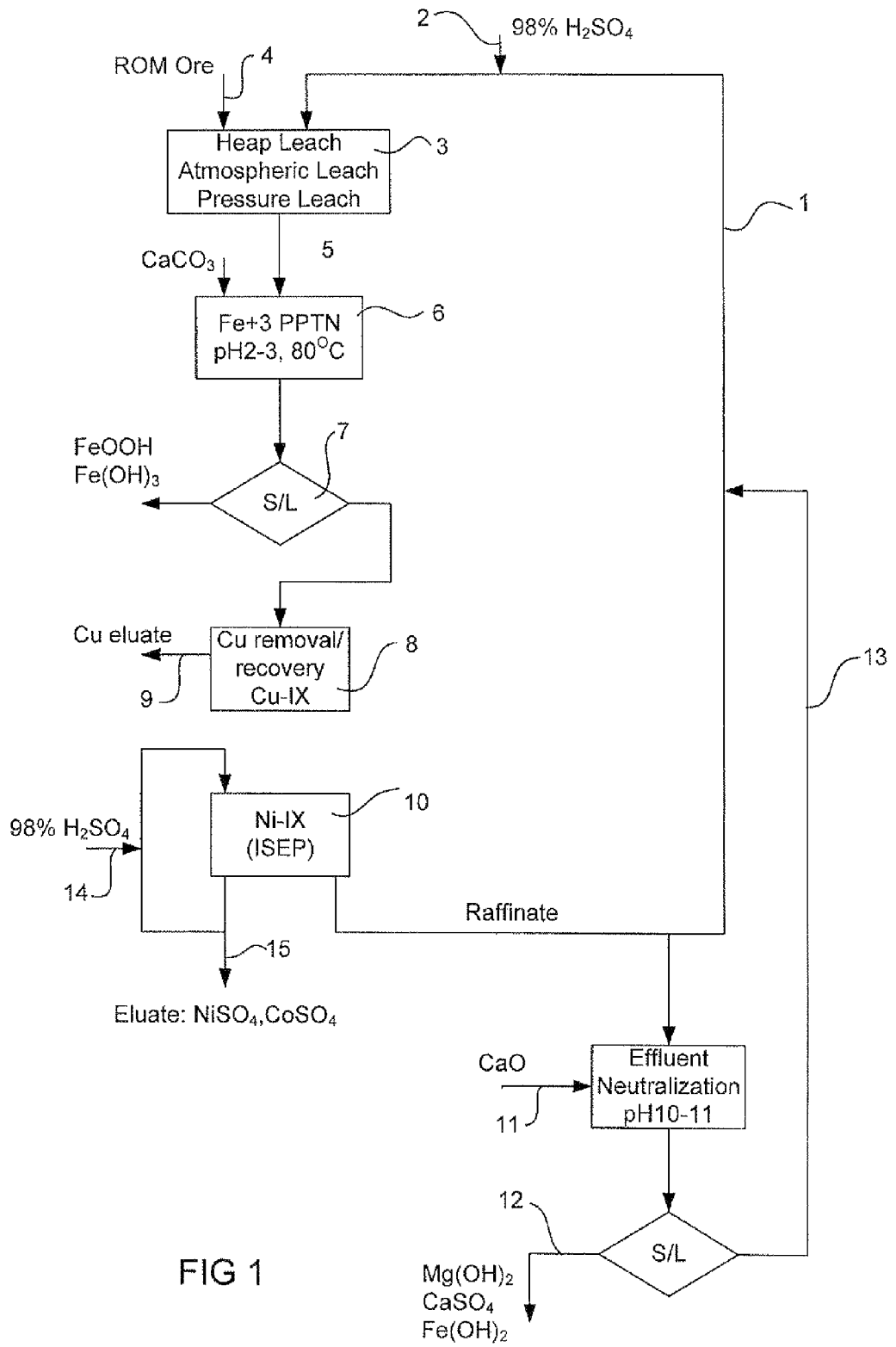
FIG. 1 illustrates a flow sheet of the invention illustrating each aspect of the invention for recovery of nickel and cobalt from laterite ore containing a substantial proportion of iron in the ferrous state, including the leach process, ferric iron precipitation, copper removal, and production of nickel/cobalt sulphate solution.

In a preferred method, which is illustrated in FIG. 1, the liquor stream (1) is sourced from the acidic nickel depleted recycled raffinate from the nickel and cobalt ion exchange step, supplemented with sulfuric acid (2), and added to the secondary heap leach (3) of Run of Mine ore (4), producing an intermediate product leach solution (5). The leach stage (3) may alternatively be an atmospheric, pressure or combination of heap, atmospheric or pressure leach processes. In one embodiment (not illustrated) the intermediate product leach solution is then added to a primary heap leach in a counter current process. This produces a nickel and cobalt rich product leach solution (PLS) with low acidity and low ferric ion concentration, which also contains ferrous iron and a number of other impurities. When the secondary heap is depleted of nickel, it is discarded, the primary heap becomes the secondary heap, and a new ore heap becomes the primary heap.

In the embodiment in FIG. 1, the product leach solution is neutralised by the addition of a suitable neutralising agent, preferably limestone, to a pH of 2-3 (6), and a preferred temperature around 80° C., but at any temperature between ambient and 90° C., in order to precipitate any ferric iron present as goethite or ferric hydroxide. Removal of ferric iron increases the effective resin capacity to extract nickel and cobalt as the ion exchange resins used to recover nickel downstream will also adsorb ferric iron. Ferrous iron, which is not adsorbed by the nickel IX resins, remains in the product leach solution.

If the nickel and cobalt are to be recovered by ion exchange, any copper present in the product liquor is preferably removed first, as the resins suitable for nickel recovery also adsorb copper and it would become an impurity in the final product. After solid/liquid separation to remove the precipitates (7), any copper in the product leach solution is removed by a preliminary ion exchange stage (8). The preferred preliminary ion exchange resins for copper IX are Amberlite IRC 748 or Bayer TP 207, but other suitable resins with selectivity for copper may be used. The copper (9) is stripped from the resin by sulphuric acid, and rejected if in small quantities.

If there is sufficient copper in the product leach solution to economically justify recovery, the copper removal step may be a solvent extraction step, using reagent such as Lix 84 or Lix 984, followed by electrowinning or cementation to recover the copper.

Accordingly, in one embodiment of the invention, prior to the recovery of nickel in the ion exchange process, any copper present in the product leach solution may be removed by contacting the product leach solution with a preliminary ion exchange resin as part of the ion exchange process, to selectively adsorb any copper present from the solution leaving the nickel, cobalt, ferrous iron and the acid soluble impurities in a preliminary raffinate.

In a further embodiment of the invention, prior to the recovery of nickel in the ion exchange process, any copper present in the product leach solution may be removed by treating the product leach solution with an organic reagent in a solvent extraction process to selectively extract any copper present leaving the nickel, cobalt, ferrous iron and the acid soluble impurities in the raffinate.

The raffinate from the copper IX is then subjected to a nickel selective ion exchange step, preferably a nickel and cobalt selective ion exchange step (10), to recover the nickel and cobalt, which are adsorbed on the resin. The selective ion exchange resin for example, preferably is a resin with a bispicolylamine functional group. Most preferably it is Dowex M4195. At pH 2 the adsorption constants indicating selectivity of the resin are in the order is $Cu^{2+}>Ni^{2+}>Fe^{3+}>Co^{2+}>Fe^{2+}>Mn^{2+}>Mg^{2+}>Al^{3+}$. Therefore the resin can recover nickel and cobalt selectively (as ferric iron has already been removed), and ferrous iron and other acid soluble impurities remain in the raffinate. The raffinate is then partially neutralised with lime or other suitable neutralising agents (11) at pH 10-11 to precipitate out and remove ferrous hydroxide and other impurities such as Mg for disposal (12), before recycling the liquor to the leach stage if required (13).

The retained nickel and iron are stripped from the resin using a mineral acid, preferably a sulfuric acid solution (14), to produce an eluate containing nickel and cobalt sulfates (15). Other resins with selectivity for nickel and cobalt, such as Amberlite IRC 748, or Bayer TP207 may also be used as the ions (ferric and copper), for which these resins have a higher selectivity than nickel and cobalt ions have been removed.

A mixed nickel/cobalt hydroxide precipitate (MHP) may then be produced from the eluate by neutralisation with magnesium oxide to pH 8-9.

The liquor stream treated by this process may also be supplemented by leachate containing at least nickel, cobalt and ferrous iron from a pressure acid leach process, an atmospheric leach process, or any combination of pressure and atmospheric leaching of laterite ores. In other alternative embodiments, the product leach solution for the ion exchange process can be sourced directly from the leachate of such leach processes, without a heap leach process.

In other alternative embodiments, the nickel and cobalt may be recovered from the IX eluate, either together by other known precipitation processes such as sulfidation, or separately by known separation methods such as solvent extraction, ion exchange or selective precipitation, followed by electrowinning or hydrogen reduction.

Accordingly, in another embodiment of the invention, the nickel and cobalt are recovered from the eluate by either:
 i) neutralising the eluate to a pH of about 8-9 to precipitate the nickel and cobalt as a mixed nickel/cobalt hydroxide product; or
 ii) separating the cobalt from the eluate by precipitation, solvent extraction or other known methods, and then subsequently neutralising the eluate to a pH of about 8-9 to precipitate the nickel as a nickel hydroxide product.

Each of the embodiments described illustrates various alternatives in the process and various combinations of the alternatives should be considered as forming part of the invention described herein.

There are several advantages of the process described where laterite contains a substantial proportion of ferrous iron rather than ferric iron as described in prior art.

Stoichiometric calculations indicate that the acid consumption to dissolve one unit of ferrous ion is two thirds of the acid consumption to dissolve ferric iron. Similarly, the limestone consumption to precipitate ferrous irons in effluent treatment is only two thirds of the limestone consumption to precipitate ferric irons. Consequently, processing a ferrous iron containing laterite in the process of the invention uses significantly less acid for leaching, and less limestone for neutralisation of the acid used. This is economically better for processing ferrous containing laterite ores, when compared to processing ferric containing laterite ores.

In some prior art processes, sulfur dioxide is used to control ORP to the range of 600-700 mV (vs AgCl/Pt probe) to break down and leach the cobalt-containing mineral asbolane (Mn, Co)$O_2$. In addition, the ORP control of <900 mV (vs AgCl/Pt probe) was essential to protect the Dow 4195 resin used in the IX recovery of nickel from oxidants such as $Cr_2O_7^{2+}$, Cr(VI), and $Mn^{4+}$ in the PLS.

A further advantage of this process is that with ferrous ions $Fe^{2+}$ leached from ferrous containing laterite ore, the ORP of PLS is naturally within the range to liberate cobalt from asbolane and to protect Dow M4195 resin from oxidants without introducing any sulphur dioxide or other reductants.

The process of the invention also offers advantages in the selection and economy of use of the IX resins.

IX with Dow M4195 resin is taught in patent WO 00/053820(BHP Minerals international Inc.) as a preferred route to recover nickel and cobalt from heap leaching PLS, because it has a unique higher affinity (selectivity) to $Ni^{2+}$ than $Fe^{3+}$ compared to other commercial resins such as Amberlite IRC748, Bayer TP207 and Purolite S930. Although Dow M4195 has this unique selectivity, its price is significantly higher than the other resins and an economic hurdle for application.

The existence of a substantial proportion of ferrous in ferrous containing laterite processed in this invention may allow the choice of a cheaper resin in the acid leach/IX processing route for nickel recovery, thus improving the economics. The high ferrous iron content of product liquor, and the low ferric content offer the following other advantages for the IX processing route.

If Dow M4195 resin is used for the nickel extraction IX stage, the effective nickel capacity of the resin is increased, as all ferric iron has been removed in the first neutralisation step, and the ferrous iron is not preferentially adsorbed by the resin. The capital investment of the IX route is therefore reduced due to the higher effective nickel capacity per unit of resin, when it is dominated by only ferrous ions.

A further advantage is that with no ferric ions loaded on the resin, cobalt can also be loaded easily, improving the efficiency of cobalt recovery by the IX process.

Without the interference of ferric ions, the inexpensive resins such as Amberlite IRC748, Purolite S930 and Bayer TP207 could replace Dow M4195 for the copper removal IX stage. The loaded copper on these resins can be stripped out with mild acidic solution instead the ammoniacal solution used for Dow M4195.

The above description is intended to be illustrative of the preferred embodiment of the present invention. It should be understood by those skilled in the art, that many variations or alterations may be made without departing from the spirit of the invention.

EXAMPLES

Example 1

The Composition of Partially Oxidised Laterite Ores and the PLS (Pregnant Leachate Solution) of Heap Leach and Atmospheric Agitation Leach Table 1 compares the chemical compositions of the fully oxidised and partially oxidised laterite ore, marked with the content of ferrous ions ($Fe^{2+}$). Mineralogical investigation identified magnetite ($Fe_3O_4$) and the lower saprolite zone (which is distinguished from the upper saprolite zone by less oxidation) were the major mineral phases containing ferrous ions ($Fe^{2+}$).

Table 2 and Table 3 show the compositions of heap leach PLS and atmospheric agitation leach PLS respectively. Ferrous ions in the PLS verified substantial ferrous ions ($Fe^{2+}$) contained the tested laterite ore.

TABLE 1

Chemical Compositions (%) of Fully and Partially Oxidized Laterite Ores

| Laterite ore | Tot. Fe | $Fe^{2+}$ | Mg | Ni | Co |
|---|---|---|---|---|---|
| Indonesian limonite | 40.8 | nd* | 1.3 | 1.53 | 0.10 |
| Indonesian saprolite | 8.5 | nd* | 14.6 | 3.37 | 0.03 |
| New Caledonian limonite | 47.1 | nd* | 0.4 | 1.33 | 0.16 |
| New Caledonian saprolite | 7.7 | nd* | 23.3 | 1.00 | 0.02 |
| Western Australian low-Mg ore | 25.4 | nd* | 4.9 | 2.50 | 0.07 |
| Western Australian high-Mg ore | 10.0 | nd* | 16.6 | 1.38 | 0.02 |
| South American partially oxidized limonite | 30.60 | 8.36 | 3.98 | 1.38 | 0.10 |
| South American partially oxidized saprolite | 14.38 | 4.93 | 15.53 | 0.96 | 0.04 |
| South American partially oxidized laterite composite of limonite and saprolite | 22.6 | 6.6 | 6.9 | 1.30 | 0.10 | nd*: Not detected

TABLE 2

Heap Leach PLS Compositions of South American Partially Oxidised Laterite Composition of Limonite and Saprolite with Weight Ratio of 1:1 and Various Leaching Conditions

| Sample No. | ORP* mV | pH | $Fe^{3+}$ g/L | $Fe^{2+}$ g/L | Mg g/L | Ni g/L | Co g/L |
|---|---|---|---|---|---|---|---|
| 1 | 432 | 2.31 | 0.7 | 4.7 | 12.01 | 2.00 | 0.23 |
| 2 | 383 | 2.99 | 0.0 | 4.0 | 13.17 | 2.14 | 0.30 |
| 3 | 415 | 2.21 | 3.25 | 15.98 | 6.34 | 1.52 | 0.11 |
| 4 | 476 | 1.47 | 28.52 | 2.93 | 6.69 | 1.04 | 0.08 |

ORP*: versus Pt/AgCl probe

TABLE 3

Atmospheric Agitation Leach PLS Compositions of South American Partially Oxidized Limonite and Saprolite (80° C., constant 100 g/L $H_2SO_4$, liquid/solid ratio: 10 mL:1 gram)

| Ore | Ni Ext. % | $Fe^{3+}$ g/L | $Fe^{2+}$ g/L | Mg g/L | Ni g/L | Co g/L |
|---|---|---|---|---|---|---|
| Limonite | 93.5 | 16.0 | 7.3 | 3.79 | 1.09 | 0.076 |
| Saprolite | 91.0 | 8.5 | 5.6 | 10.2 | 0.74 | 0.043 |

Example 2

Atmospheric Leaching of Ferrous Bearing Nickel Laterite Ore

One liter of 25% w/w limonite slurry was added to an agitated three liter reactor and heated to 60° C. 98% sulphuric acid was added to the slurry with the acid/limonite weight ratio of 650 kg acid per dry tonne of ore, increasing the leach temperature to approximately 100° C. The limonite slurry was leached for three hours, after which time approximately 90% of the solid was dissolved.

Approximately one liter of 25% w/w saprolite slurry was added to the limonite leached slurry. The presence of saprolite consumes remnant free acidity. This in turn causes ferric iron present in solution to precipitate, either as a jarosite or as goethite. The precipitation of iron generates free acidity in solution which further leaches the saprolite slurry. This process continues to equilibrium over eleven hours, with a leach temperature of 100° C. maintained throughout.

After saprolite leaching a slurry of limestone is added to the reactor. The limestone neutralises any remaining acid in solution and precipitates any remaining ferric ions.

Figure 2:
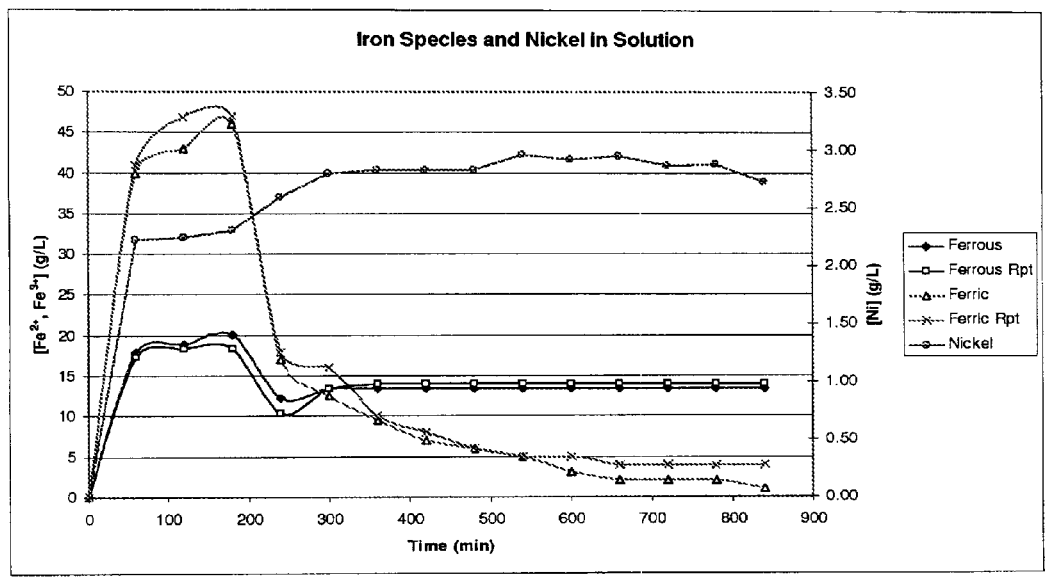
FIG. 2 shows the relationship between ferrous and ferric iron and nickel in solution with time during the atmospheric leach process.

FIG. 2 shows the relationship between ferrous and ferric iron and nickel in solution with time during the atmospheric leach process. The graph shows that with time ferric iron ions are precipitated from the liquid phase, showing the separation of ferric ions from nickel and ferrous ions in solution. The concentration of nickel increases with time as the saprolite slurry is leached and remains unaffected by the precipitation of ferric ions. The obtained PLS is an intermediate product for the manufacture of nickel/cobalt mixed hydroxide or sulfide, ferronickel, metallic nickel powders or nickel cathode.

Example 3

Nickel Recovery with Ferric Ions Precipitation Followed by IX Separation/Purification In a pilot plant operation, the heap leach PLS was heated at 80° C. and neutralised to pH 2.5-3.5 with limestone slurry to precipitate ferric ions as goethite or para-goethite or ferrihydrite or hydroxide. Ferrous ions $Fe^{2+}$ were not precipitated under such conditions. After solid/liquid separation with a frame filter, the filtrate containing $Ni^{2+}$ and $Fe^{2+}$ was first passed through a Copper-IX fixed-bed column to scavenge $Cu^{2+}$. The solution was then passed through an IX device named ISEP® in which 30 IX columns charged with ion exchange resin Dow M4195 are fixed on a carousel. An acidified, synthetic spent electrolyte solution, manufactured to correspond to a nickel electrowining solution was used as a stripping solution. Almost all impurities such as ferrous, aluminum, chromium and magnesium ions were rejected into the raffinate, with nickel recovered in the eluate. Table 4 illustrate the compositions for the feed in/out solution to ferric ions precipitation, ISEP® feed solution, raffinate and eluate. Variations in the composition of various liquid streams indicated that nickel was separated from impurities and purified with the consecutive operation of ferric ions precipitation and ion exchange. The obtained elution solution is an intermediate product for manufacture of nickel/cobalt mixed hydroxide or sulfide, ferronickel, metallic nickel powders or nickel cathode.

TABLE 4

Average Compositions of Liquid Streams of the Process of Heap Leach-Ferric Ions precipitation-Nickel Recovery with IX (Ion Exchange)

| Stream | Ni g/L | $Fe^{3+}$ g/L | $Fe^{2+}$ g/L | Co g/L | Al g/L | Cr g/L | Cu mg/L | Mg g/L | Mn g/L |
|---|---|---|---|---|---|---|---|---|---|
| Heap leach PLS | 1.94 | 8.56 | 10.89 | 0.23 | 4.10 | 0.24 | 12 | 10.63 | 1.74 |
| Filtrate after $Fe^{3+}$ precipitation | 1.57 | 0.23 | 10.14 | 0.21 | 2.90 | 0.06 | 9 | 9.60 | 1.57 |
| ISEP® feeding solution after $Cu^{2+}$ scrubbing | 1.39 | 0.20 | 8.81 | 0.19 | 1.94 | 0.05 | 1 | 8.34 | 1.32 |
| ISEP® Raffinate | 0.10 | 0.10 | 8.29 | 0.15 | 2.02 | 0.05 | 0 | 7.85 | 1.28 |
| ISEP® Eluate | 47.06 | 3.80 | 0 | 0.75 | 0.26 | 0.018 | 21 | 0.02 | 0.03 |

The invention claimed is:

1. A heap leach process for the recovery of nickel, cobalt, or mixtures thereof from laterite or partially oxidized laterite ores having a substantial proportion of iron present in the ferrous state comprising:
   a) providing a laterite or partially oxidized laterite ore containing ferrous iron wherein the ferrous iron is about 30% or greater by weight of a total iron content in the ore;
   b) heap leaching the ore with an acidified solution to provide a product leach solution containing at least ferrous iron, and a first metal selected from nickel, cobalt, or a mixture thereof together with acid soluble impurities;
   c) recovering the first metal from the product leach solution with a selective ion exchange resin in an ion exchange process producing a raffinate and leaving the ferrous iron and other acid soluble impurities in the raffinate;
   d) stripping the first metal from the selective ion exchange resin to produce an eluate containing the first metal; and
   e) recovering the first metal from the eluate by either
      i. neutralizing the eluate to a pH of about 8-9 to precipitate the nickel as nickel hydroxide, cobalt as cobalt hydroxide, or a mixed nickel/cobalt hydroxide product, or
      ii. separating cobalt from the eluate by precipitation, solvent extraction or other known methods, and then subsequently neutralizing the eluate to a pH of about 8-9 to precipitate nickel as a nickel hydroxide product.

2. A process according to claim 1 wherein the product leach solution is partially neutralized to precipitate and separate any ferric iron from the solution prior to the ion exchange process.

3. A process according to claim 1 wherein prior to the recovery of the first metal in the ion exchange process, copper present in the product leach solution is removed.

4. A process according to claim 3 wherein the copper is removed by contacting the product leach solution with a preliminary ion exchange resin as part of the ion exchange process, to selectively adsorb any copper present from the solution leaving the first metal, ferrous iron and the acid soluble impurities in a preliminary raffinate.

5. A process according to claim 4 wherein the preliminary ion exchange resin is a resin with a iminodiacetic acid chelating ion or a bis-picolylamine functional group.

6. A process according to claim 4 wherein the copper is stripped from the preliminary ion exchange resin with a mild acid solution for disposal or recovery.

7. A process according to claim 4 wherein the copper is recovered by electrowinning or cementation.

8. A process according to claim 4 wherein the preliminary raffinate is contacted with the selective ion exchange resin as part of the ion exchange process to selectively adsorb the first metal from the preliminary raffinate, leaving the ferrous iron and other acid soluble impurities in the raffinate.

9. A process according to claim 3 wherein copper present in the product leach solution is removed by treating the product leach solution with an organic reagent in a solvent extraction process to selectively adsorb any copper present leaving the first metal, ferrous iron and the acid soluble impurities in the raffinate.

10. A process according to claim 1 wherein the selective ion exchange resin is selective for at least the adsorption of the first metal, whereby the first metal is recovered by stripping the first metal from the selective resin.

11. A process according to claim 10 wherein the selective ion exchange resin has a bis-picolylamine functional group.

12. A process according to claim 1 wherein the first metal is stripped from the resin with a mineral acid solution.

13. A process according to claim 1 wherein the cobalt is precipitated by sulfidation.

14. A process according to claim 1 wherein the heap leach process is established in a counter current system by:
   a) preparing a primary and secondary heap;
   b) treating the secondary heap with a liquor stream comprising recycled raffinate from the ion exchange process, supplemented with sulfuric acid to produce an intermediate product liquor solution;
   c) treating the primary heap with the intermediate product liquor solution to produce the product liquor solution containing at least the first metal, iron and acid soluble impurities.

* * * * *